(12) United States Patent
Keune

(10) Patent No.: US 9,883,734 B2
(45) Date of Patent: Feb. 6, 2018

(54) HOLDING DEVICE FOR A MOBILE MULTIMEDIA TERMINAL

(71) Applicant: headflat GmbH, Karlsruhe (DE)

(72) Inventor: Dirk Keune, Ettlingen (DE)

(73) Assignee: headflat GmbH, Karlsruhe (DE)

( * ) Notice: Subject to any disclaimer, the term of this patent is extended or adjusted under 35 U.S.C. 154(b) by 0 days.

(21) Appl. No.: 14/972,681

(22) Filed: Dec. 17, 2015

(65) Prior Publication Data

US 2016/0174695 A1   Jun. 23, 2016

(30) Foreign Application Priority Data

Dec. 19, 2014   (DE) .................... 20 2014 106 178 U

(51) Int. Cl.
| | |
|---|---|
| A45F 5/02 | (2006.01) |
| F16M 11/04 | (2006.01) |
| F16M 13/04 | (2006.01) |
| H04M 1/04 | (2006.01) |
| G02B 27/01 | (2006.01) |
| G06F 1/16 | (2006.01) |
| H04M 1/05 | (2006.01) |
| A42B 1/24 | (2006.01) |

(52) U.S. Cl.
CPC .............. *A45F 5/02* (2013.01); *F16M 11/041* (2013.01); *F16M 13/04* (2013.01); *G02B 27/0176* (2013.01); *G06F 1/163* (2013.01); *H04M 1/04* (2013.01); *H04M 1/05* (2013.01); *A42B 1/245* (2013.01); *A45F 2200/0516* (2013.01)

(58) Field of Classification Search
CPC . A45F 5/02; A45F 2200/0516; F16M 11/041; F16M 13/04; G02B 27/0176; G06F 1/163; H04M 1/04; H04M 1/05; A42B 1/245
See application file for complete search history.

(56) References Cited

U.S. PATENT DOCUMENTS

| | | | | |
|---|---|---|---|---|
| 1,560,002 A | * | 11/1925 | Thompson | ............. A42B 1/247 2/10 |
| 3,988,058 A | * | 10/1976 | Chaney | .................. A42B 1/247 2/195.5 |

(Continued)

FOREIGN PATENT DOCUMENTS

| | | |
|---|---|---|
| DE | 202009009326 | 12/2009 |
| DE | 20201009960 | 11/2010 |

(Continued)

*Primary Examiner* — Corey Skurdal
(74) *Attorney, Agent, or Firm* — Volpe and Koenig, P.C.

(57) ABSTRACT

A holding device for a mobile digital multimedia terminal having a holding arm and a fastening device at a first end of the holding arm for fastening to a headgear so that the holding arm extends from the headgear towards a front in the direction of view of a user. A holder for the multimedia terminal is arranged at the second end of the holding arm that is adjustable in reference to the holding arm such that the graphic display is essentially locatable in the middle of a view field. A clamping element with a clamping structure and a counterpart to the clamping element are provided in proximity to the first end to connect the clamping element in a detachable fashion to the holding arm and to fix the holding device in a detachable fashion with the first end of the holding arm in the proximity of the clamping structure.

19 Claims, 3 Drawing Sheets

(56) References Cited

U.S. PATENT DOCUMENTS

| | | | | |
|---|---|---|---|---|
| 6,007,198 A | * | 12/1999 | Burton | G02C 9/02 |
| | | | | 351/41 |
| 6,174,058 B1 | | 1/2001 | Hsiao | |
| 9,467,600 B2 | * | 10/2016 | Orbassano | F16M 11/06 |
| 2006/0037125 A1 | * | 2/2006 | McDowell | A42B 1/247 |
| | | | | 2/209.13 |
| 2012/0175394 A1 | * | 7/2012 | Keune | F16M 13/04 |
| | | | | 224/483 |
| 2013/0004153 A1 | * | 1/2013 | McKee | F16M 11/041 |
| | | | | 396/420 |
| 2016/0045018 A1 | * | 2/2016 | Keune | A42B 1/245 |
| | | | | 224/181 |

FOREIGN PATENT DOCUMENTS

| | | |
|---|---|---|
| DE | 202013000740 | 4/2013 |
| EP | 2103862 | 9/2009 |
| EP | 2103863 | 9/2009 |
| ES | 2145666 | 7/2000 |

\* cited by examiner

HOLDING DEVICE FOR A MOBILE MULTIMEDIA TERMINAL

BACKGROUND

The invention relates to a holding device according to a mobile digital multimedia terminal, such as a pocket PC, smartphone, or the like for fastening the terminal to an essentially commercial headgear.

Generic or similar holding devices are known from DE 20 2009 009 326 U1, DE 20 2010 009 960 U1, DE 20 2013 000 740 U1, and EP 2 103 863 B1. The invention is based on the objective to further develop the holding devices of prior art with regards to a simple and low-cost embodiment, ability for secure fixation at the headgear, and with regards to increased flexibility of use.

SUMMARY

This objective is attained by a holding device according to the invention. Advantageous further developments of the invention are disclosed below.

According to the invention a holding device for a mobile digital multimedia terminal, such as a pocket PC, smartphone, or the like comprising: a holding arm; fastening means arranged at a first end of the holding arm, which are embodied for fastening the holding arm to a headgear, preferably a commercial baseball cap or a commercial headband with a sun visor, so that the holding arm in its assembled state extends from the headgear towards the front in the direction of view of a user; receiving and holding means for the multimedia terminal arranged at the other, second end of the holding arm; with the receiving and holding means for the multimedia terminal being arranged or adjustable in reference to the holding arm such that at least the graphic display device of a multimedia terminal received therein, after the fastening of the holding arm at the headgear, is essentially located in the middle of the range of view of a user, characterized in that the holding device comprises at least one clamping element with a clamping structure, and that in the proximity of the first end of the holding arm at least one counterpart to the clamping element is provided in order to connect the clamping element in a detachable fashion to the holding arm and to fix the holding device in a detachable fashion with the first end of the holding arm in the proximity of the clamping structure to the headgear.

In a further development of this object it may be provided that the clamping element exhibits at least one projection and that at least one seat is provided as a counterpart for said projection, whereat the clamping element with its projection can essentially be inserted or entered in said seat in a form-fitting fashion, or that inversely the seat is arranged at the clamping element and the projection at the holding arm.

The provision of at least one clamping element with a projection and clamping structure, which projection cooperates with the seat at the first end of the holding arm and/or the provision of a clamping element and a counterpart allows fixing of the holding arm in a simple and flexible, yet detachable fashion to the headgear. Accordingly, no conversion or preparation of the headgear is required in order to bring the holding device into the intended operation. Based on the fact that the clamping element with its projection can be inserted or entered into the above-mentioned seat and/or cooperates with the counterpart the holding device according to the invention can be used in a plurality of commercial headgears because this way an adjustment is possible to certain dimensions of the headgear in the area of fixation (material thickness or the like). An inversely designed embodiment is possible as well, in which the clamping element shows the seat and the projection is provided at the holding arm.

Advantageously the fastening of a mobile terminal via the holding device occurs by precisely one holding arm at a commercial baseball cap.

The holding arm is fastened via at least one clamping element laterally at the left or the right side of the baseball cap, which is explained in greater detail in the following. The area at which the holding arm is connected to the cap may be located at the side and/or also in the rear area of the cap and/or the headgear.

As already mentioned, the connection of the holding arm to the headgear occurs preferably via a kind of plug-in connection (seat and projection), which for the purpose of fixation can be connected to a clip, a magnet, a screw, a clamp, or a Velcro strip.

The holding arm preferably abuts the cap or headgear on the outside. The counterpart required for fastening at the cap contacts the interior of the cap and is fastened for example via the above-mentioned plug-in connection at the holding arm. Alternatively, as already mentioned, the two parts may also be connected via a magnet, Velcro strip, a screw, a clip, or a clamp.

The holding arm is this way detachable at least at one point, however it is connected tightly to the cap.

In order to connect the holding arm even more securely to the cap and particularly prevent any lateral slippage of the cap it has proven particularly advantageous for the holding arm to be additionally fastened at the visor of the cap as well.

For this purpose, in a further development of the invention another fastening means (clamping device) may be provided, which is advantageously embodied as a plastic part. The fastening means and/or plastic part are advantageously designed such that it can be fastened at the holding arm, which extends towards the front over the visor of the cap. The fastening may occur via a latching, a clip, a screw, a magnet, a Velcro strip, or a plug-in connection, without limitation thereto.

Advantageously the plastic part and/or the fastening means comprises at one side a structured or otherwise treated surface, that will prevent any slippage in reference to the visor of the cap. For example, burls, peaks, or strips made from a suitable material (elastomer or the like) may be arranged in the above-mentioned area, preferably pressing from the bottom against the visor of the cap when the plastic part (fastening means) is fastened as intended at the holding arm.

In a further development of the fastening means according to the invention it may be provided that for fixing the holding arm to the headgear at least two clamping elements with counterparts are provided in order to increase the safety of the connection.

For the same reason it may also be provided that at least two clamping elements with counterparts are arranged spaced apart from each other.

As already mentioned, the seat and the projection and/or the clamping element, the counterpart may be embodied complementary like a screw, latch, press-fit, magnet, or Velcro connection.

A further development of the holding device according to the invention provides that the seat and holding means arranged at the second end of the holding arm for the multimedia terminal comprise at least another clamping element with a clamping structure, and that in the proximity of the second end of the holding arm at least one penetration is provided for another counterpart, which cooperates with the other clamping element in order to connect the other clamping element to the holding arm in a detachable fashion and to fix the multimedia terminal to the second end of the holding arm in a detachable fashion, preferably by the second clamping element comprising at least one seat in which receiver the other counterpart can be inserted or entered essentially in a form-fitting fashion or vice versa. This way a particularly simple and yet secure fastening option is generated for the multimedia terminal.

In a further development of this idea it may be provided that at the second end of the holding arm at least two additional clamping elements and respective second counterparts are arranged at a distance from each other, which distance can preferably be altered and adjusted such that the seat and the holding means can be adjusted to differently sized multimedia devices.

Even with regards to the seat and holding means it may be provided that the receiver and the projection and/or the additional clamping element and the other counterparts are embodied complementarily like a screw, latch, press-fit, magnet, or Velcro connection.

Another further development of the holding device according to the invention provides that the holding arm has an angle or a bend in the proximity of the second end in order to position the seat and holding means for the multimedia terminal in the field of view of the user, with the degree of the angle or bend preferably ranging from 70° to 110°, and most preferred amounting to approximately 90°, with the seat and the holding means for the multimedia terminal being arranged in the proximity of the angled section. This way, the holding device can fulfill the intended purpose for use in a particular fashion.

Further, it may be provided that the holding arm is embodied, preferably in an adjustable fashion, such that the seat and holding means for the multimedia terminal are positioned at a distance from 10 cm to 40 cm, preferably from 15 cm to 30 cm in front of the eye of the user. This way, the multimedia terminal and/or its display device (monitor) can be viewed in an optimal and relaxed fashion.

The holding arm may be comprised of several parts, preferably two or three parts, with respectively several components. This way the holding device can be packaged in the unassembled state easily and in a space-saving fashion. The components may be embodied such that they can be assembled, preferably plugged together to form the holding arm, so that a particularly simple assembly is ensured.

Another further development of the holding device according to the invention provides that a component, comprising the first end of the holding arm, is embodied in a curved fashion so that it extends in the assembled state from a lateral area, in reference to the head of the user, after the fastening of the holding arm at the headgear, in an area essentially in the middle of the field of view of the user. Preferably the holding arm contacts and/or rests here laterally at the headgear as well as perhaps the visor of a commercial baseball cap.

Another further development of the holding device according to the invention provides that the seat and holding means for the multimedia terminal can be adjusted to differently sized multimedia terminals.

The holding arm may essentially be embodied stiffly, at least at its sections facing the receiver and holding means for the multimedia terminal, with the holding arm preferably showing at least one joint, so that the seat and holding means for the multimedia terminal being freely mobile out of the range of view of the user. This increases the comfort of use and renders the holding device adjustable to different situations of use.

The holding arm may at least sectionally be embodied essentially flat and/or at least sectionally have a round or polygonal cross-section. Preferably the holding arm is made from plastic.

For the fixation at a sun visor of the headgear, at last one additional clamping means may be provided, which has already been pointed out. This clamping means can be or is connected, preferably in a detachable fashion, to the holding arm and to the sun visor.

In a further development, the above-mentioned clamping means may comprise at least two plug-in parts, embodied to connect the holding arm in an encompassing fashion or to cooperate with each other in a connecting fashion. Here, one of the plug-in parts may show a projecting structure, which is intended to contact the sun visor of the headgear at a side facing away from the holding arm.

Furthermore, it may be provided that the clamping means shows a structured or coated or otherwise treated surface at the projecting structure, for example in the form of burls, points, or strips, as already mentioned, in order to preferably contact the sun visor of the headgear from the bottom in a non-slip fashion.

The above-mentioned plug-in parts may be embodied complementarily like a screw, latch, press-fit, magnet, or Velcro connection.

BRIEF DESCRIPTION OF THE DRAWINGS

Additional features and advantages of the invention are discernible from the following description of exemplary embodiments based on the drawing.

DETAILED DESCRIPTION OF THE PREFERRED EMBODIMENTS

Figure 1:
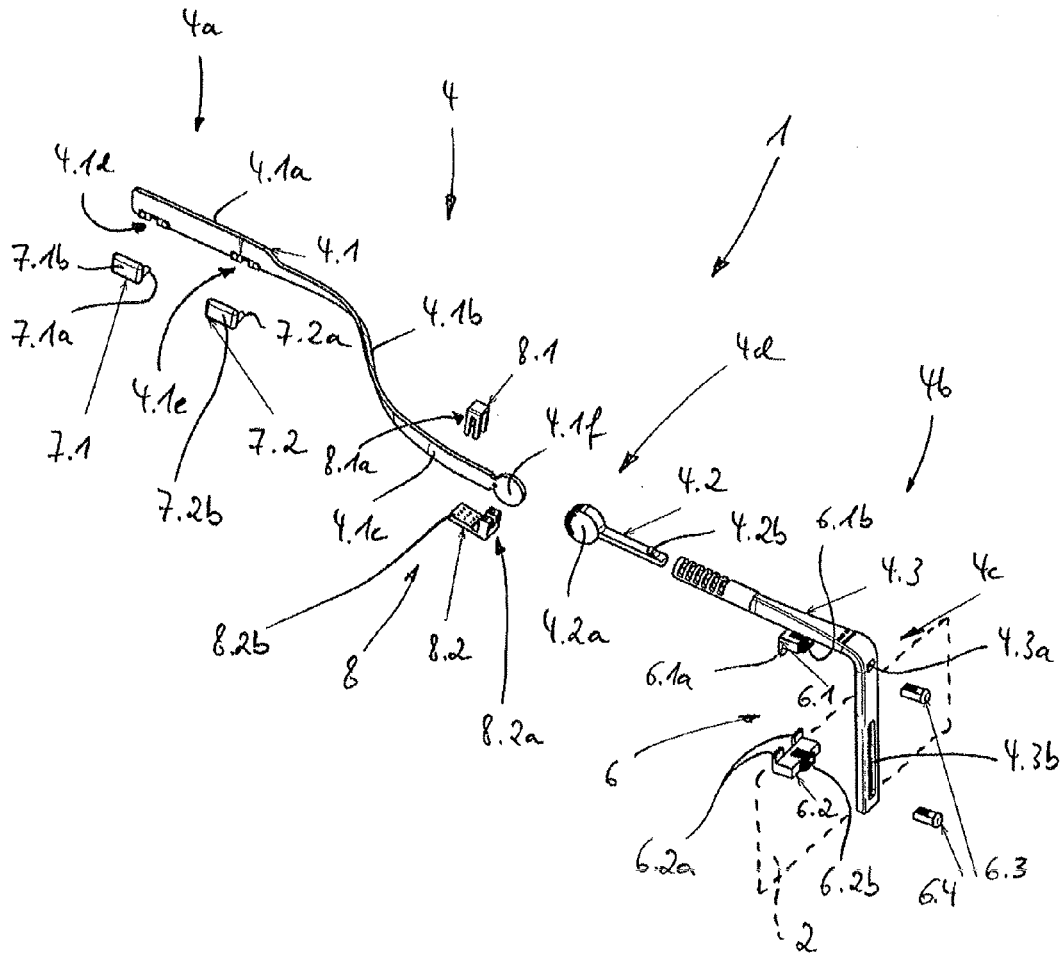
FIG. 1 shows a holding device according to the invention in a disassembled state.

The holding device according to the invention in its entirety is marked with the reference character 1 in the figures. It essentially comprises an individual holding arm 4, which is comprised from three individual parts or components 4.1, 4.2, and 4.3. In the respective exemplary embodiment the components 4.1 to 4.3 can be plugged together in order to form the holding arm 4. The first component 4.1 of the holding arm defines a first end 4a of the holding arm 4, while the third component 4.3 defines a second end 4b of the holding arm 4.

The first component 4.1 of the holding arm 4, similar to the remainder of the device, is made from a (flat) plastic material and comprises a first straight section 4.1a, followed by a curved section 4.1b, which in turn transfers into a second straight section 4.1c. The second straight section 4.1c is laterally offset in reference to the first straight section 4.1a, as shown. In the first straight section 4.1a, i.e. in the proximity of the first end 4a, the holding arm 4 exhibits two recesses 4.1d, 4.1e, spaced apart from each other and embodied and intended to cooperate with respectively one clamping element 7.1, 7.2. The clamping elements 7.1, 7.2 each have at least one projection 7.1a, 7.2a and one clamping structure 7.1b, 7.2b. In the embodiment shown the two clamping elements 7.1, 7.2 also include at least one second projection, which however is not discernible due to the illustration chosen (cf. FIG. 3). With the projection in 7.1a, 7.2a the clamping elements 7.1, 7.2 can be inserted in an essentially form-fitting fashion into the seat 4.1d, 4.1e in order to connect the respective clamping element 7.1, 7.2 to the holding arm 4 in a detachable fashion. This way the holding device 1 can be fixed with the first end 4a of the holding arm 4 in the proximity of the clamping structure 7.1b, 7.2b in a detachable fashion to the headgear (not shown in FIG. 1), by one edge of the headgear being inserted on the one side between the area 4.1a of the holding arm 4 and the above-mentioned clamping structure 7.1a, 7.2a on the other side, as explained in greater detail in the following based on FIGS. 2 and 3.

At an end of the first component 4.1, facing away from the first end 4a of the holding arm 4, it has a circularly expanded structure 4.1f embodied to connect to a complementary structure at the second component 4.2 of the holding arm 4. This complementary structure is marked with the reference character 4.2a in FIG. 1. Concretely the structure 4.21 is embodied to receive the structure 4.1f, allowing to realize an articulate, pivotal connection of the first component 4.1 to the second component 4.2. This way the second component 4.2 can be pivoted about an axis perpendicular in reference to the longitudinal extension of the holding arm 4 and/or the section 4.1c upwards and downwards so that a joint 4d is formed, here.

At its end facing away from the structure 4.2a the second component 4.2 has a latching cam 4.2b, which allows a secure connection to the third component 4.3 of the holding arm 4. For this purpose the second component 4.2 of the holding arm 4 is inserted in a suitable seat (not shown) at the end of the third component 4.3 facing towards it.

In the proximity of the third component 4.3 the holding arm 4 has an angled section 4c essentially by about 90° downwards so that the free end of the third component 4.3 in the intended use of the holding device 1 (FIGS. 2 and 3) is located approximately in the middle of the field of view of the user. In this area, the seat and holding means 6 are arranged for a multimedia terminal 2 (only indicated). The concrete embodiment of the seat and holding means 6 mentioned is discussed in greater detail in the following.

The seat and holding means 6 for the multimedia terminal 2 comprise preferably two additional clamping elements 6.1, 6.2, which respectively cooperate with another counterpart 6.3, 6.4 in a connecting fashion. For this purpose, in the angled section of the third component 4.3 of the holding arm 4 respective penetrations 4.31, 4.3b are provided, with the penetration 4.3b being embodied as an oblong hole in order to allow adjusting a position of the additional clamping element 6.2 of the other counterpart 6.4 regarding the holding arm 4 to a respective dimension of the terminal 2. The other clamping elements 6.1, 6.2 each have a clamping structure 6.1a, 6.21 in the form of projections as well as a seat 6.1b, 6.2b, engaged by the respectively other counterpart 6.3, 6.4 in order to fix the clamping elements 6.1, 6.2 and furthermore also the terminal 2 at the holding arm 4.

As discernible for one trained in the art the optional connections in the proximity of the clamping elements 7.1, 7.2 and/or the other clamping elements 6.1, 6.2 may also be embodied inversely: For example the holding arm 4 may have projections in the proximity of the first component 4.1, while the clamping elements 7.1, 7.2 are equipped with respective receivers. Similarly, the other clamping elements 6.1, 6.2 may have projections, which engage respective seats of the other counterparts 6.3, 6.4.

In general, the invention is not limited to the provision of the projections and seats, as discernible from the claims.

In the proximity of the front end of the first component 4.1 of the holding arm 4 an additional clamping means 8 is provided, which serves to fix the holding arm 4 to the sun visor of a headgear. The clamping means 8 can be connected in a detachable fashion to the holding arm 4 and to the sun visor (not shown here). For this purpose, the clamping means 8 comprises at least two plug-in parts, in FIG. 1 marked with the reference characters 8.1 and/or 8.2. These plug-in parts are embodied such that they encompass the holding arm 4 in a detachable connection. For this purpose the plug-in part 8.1 has a projecting structure 8.1a in the exemplary embodiment shown, which can engage and/or engages a respective seat 8.2a of the second plug-in part 8.2. Additionally the second plug-in part 8.2 also has a laterally projecting structure 8.2b, intended to contact the sun visor of the headgear (not shown) at a side facing away from the holding arm 4. In order to ensure a secure connection, here a structured or coated or otherwise treated surface is provided at the projecting structure 8.2b, as shown in FIG. 1 as an example.

Figure 2:
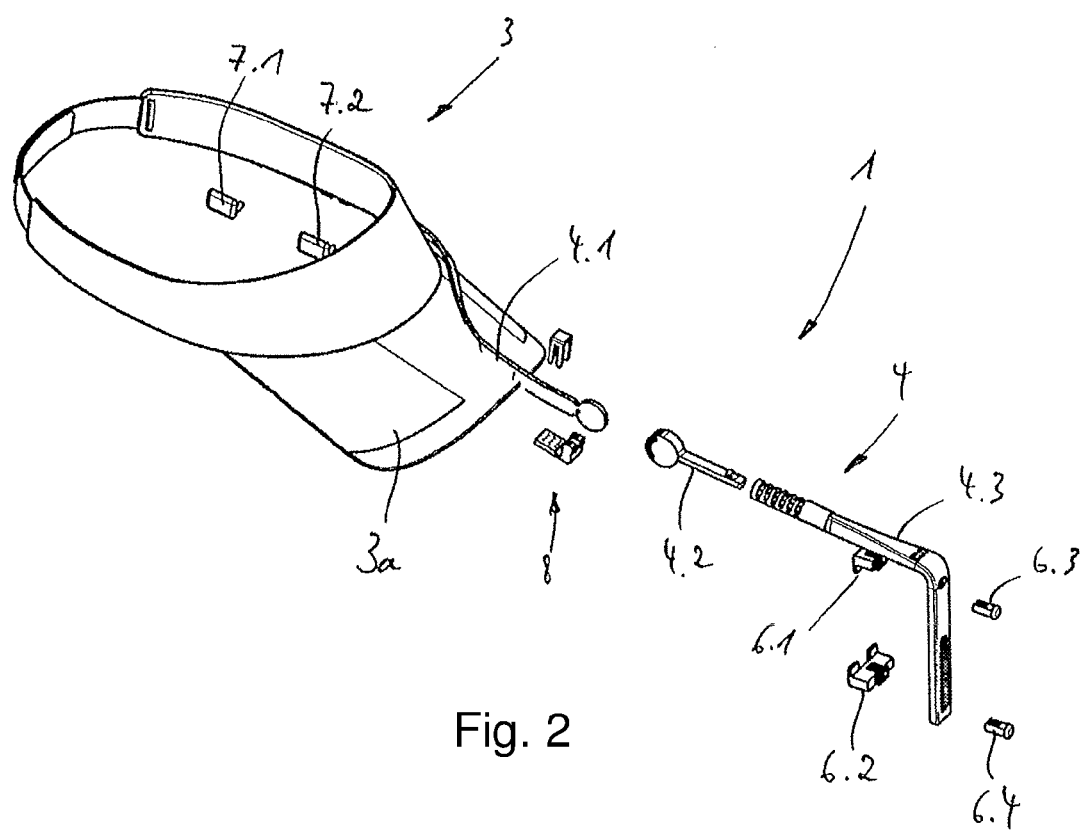
FIG. 2 shows as an example the cooperation of the holding means of FIG. 1 with a commercial baseball cap from a first perspective.
Figure 3:
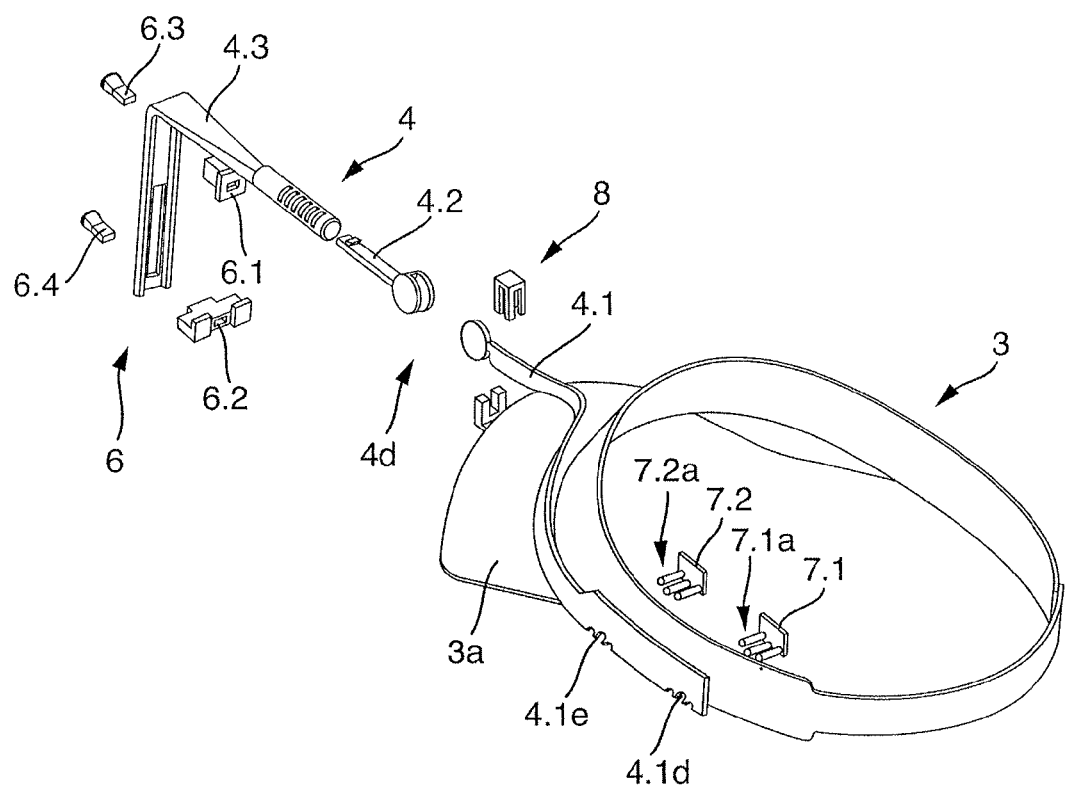
FIG. 3 shows the cooperation according to FIG. 2 from a different perspective.

FIGS. 2 and 3 show the intended use of the holding device 1 according to FIG. 1, with for reasons of clarity in FIGS. 2 and 3 not all components of the holding device 1 being explicitly marked again.

In order to illustrate the use, FIGS. 2 and 3 also show a commercial headgear 3 embodied like a headband with a sun visor 3a. However, the invention is not limited to the use of such a headgear 3.

As already described, the holding arm 4 is fastened with its first component 4.1 laterally at the headgear 3 by connecting the clamping elements 7.1, 7.2 to the holding arm 4 and/or the component 4.1 in the proximity of the seats 4.1d, 4.1e located there. This is particularly clearly discernible from the illustration of FIG. 3, from which it is also discernible that the clamping elements 7.1, 7.2 have more than one projection 7.1a, 7.2a. The seats 4.1d, 4.1e at the first component 4.1 of the holding arm 4 are embodied accordingly. This way a simple and secure connection results of the holding arm 4 and the headgear 3, without it being necessary here to prepare the headgear 3 in any shape and form. By an adjustment of the penetrating depth of the projections 7.1a, 7.2a into the seats 4.1d, 4.1e the connection can also be adjusted to the headgears 3 embodied differently (with regards to thickness).

Subsequently, an additional fixation of the holding arm 4 and/or the first component 4.1 occurs via the clamping means 8 in the proximity of the visor 3a, as already described above. Furthermore, the components 4.2, and 4.3 are connected to each other and to the first component 4.1, in order to form the complete holding device 1 and/or the complete holding arm 4. By assembling the other clamping elements 6.1, 6.2 with the respective additional counterparts 6.3, 6.4 in the frontal section of the holding arm 4, subsequently the two above-described seat and holding means 6 are available for the terminal 2 to be fastened, which additionally are adjustable to the differently sized terminal 2 via the above-described oblong hole. By the joint at the reference character 4d the terminal 2 can be pivoted out of the range of view of the user, if necessary. The plug-in connection between the components 4.2 and 4.3 may be embodied rotationally about a longitudinal axis of the arrangement in order to this way realize other adjustment options for the entire holding device 1.

The invention claimed is:

1. A holding device (1) for a mobile digital multimedia terminal (2), comprising:
   a holding arm (4);
   a fastening device (5) arranged at a first end (4a) of the holding arm (4), embodied for fastening the holding arm to a headgear (3), so that in an assembled state the holding arm (4) extends from the headgear (3) in a direction of view of a user towards a front;
   a seat and holder (6) for the multimedia terminal (2) arranged at a second end (4b) of the holding arm;
   said seat and holder (6) for the multimedia terminal (2) being adjustable in reference to the holding arm (4) such that at least a graphic display device (2a) of a multimedia terminal (2) received therein, after fastening of the holding arm (4) at the headgear (3), is essentially adapted to be located in a middle of a field of view of the user,
   at least one clamping element (7.1, 7.2) with a clamping structure (7.1b, 7.2b), and at least one counterpart located in proximity to the first end of the holding arm provided for the at least one clamping element (7.1, 7.2) in order to connect the clamping element (7.1a, 7.2a) to the holding arm (4) in a detachable fashion, and to fix the holding device (1) with the first end (4a) of the holding arm (4) in proximity of the clamping structure (7.1b, 7.2b) to the headgear (3) in a detachable fashion; and
   the at least one clamping element (7.1, 7.2) comprises at least one projection (7.1a, 7.2a) and at least one seat (4.1d, 4.1e) is provided as the at least one counterpart for the projection (7.1a, 7.2a), and the clamping element 7.a, 7.2) with said projection (7.1a, 7.2a) is intertable in an essentially force-fitting fashion into the seat (4.1d, 4.1e), or inversely the seat is arranged on the clamping element and the projection is arranged on the holding arm.

2. The holding device (1) according to claim 1, wherein at least of the two clamping elements (7.1, 7.2) are provided.

3. The holding device (1) according to claim 2, wherein the at least two clamping elements (7.1, 7.2) are arranged spaced apart from each other.

4. The holding device (1) according to claim 1, wherein the clamping element (7.1, 7.2) and the counterpart are embodied in a complementary fashion.

5. The holding device (1) according to claim 1, wherein the holding arm (4) has an angle or bend (4c) in proximity to the second end (4b) in order to position the seat an holder (6) for the multimedia terminal (2) in the field of view of the user, with a degree of angular offset or bend (4c) ranging from 70° to 110°, with the seat and holder (6) for the multimedia terminal (2) being arranged in proximity to the angular offset (4c).

6. The holding device (1) according to claim 1, wherein the holding arm (4) is embodied in an adjustable fashion such that the seat and holder (6) for the multimedia terminal (2) is adapted to be positioned at a distance from 10 cm to 40 cm from an eye of the user.

7. The holding device (1) according to claim 1, wherein the holding arm (4) is embodied from several parts, respectively having several components (4.1, 4.2, 4.3).

8. The holding device (1) according to claim 7, wherein the components (4.1, 4.2, 4.3) are joinable together to form the holding arm (4).

9. The holding device (1) according to claim 7, wherein a component (4.1) comprising the first end (4a) of the holding arm (4) is embodied curved such that it extends in an assembled state from a lateral section in reference to a head of the user, after fastening the holding arm (4) to the headgear (3), in an area essentially in a center of the field of view of the user.

10. The holding device (1) according to claim 1, wherein the receiver and holder (6) for the multimedia terminal (2) is adjustable to differently sized multimedia terminals.

11. The holding device (1) according to claim 1, wherein the holding arm (4) is essentially embodied stiffly in a section thereof facing the seat and holder (6) for the multimedia terminal (2), with the holding arm (4) preferably comprising at least one joint (4d) so that the seat and holder for the multimedia terminal is adapted to be movable out of the field of view of the user.

12. The holding device (1) according to claim 1, wherein the holding arm (4) at least sectionally is embodied essentially flat, or the holding arm at least sectionally has a round or polygonal cross-section.

13. A holding device (1) for a mobile digital multimedia terminal (2), comprising:
   a holding arm (4);
   a fastening device (5) arranged at a first end (4a) of the holding arm (4), embodied for fastening the holding arm to a headgear (3), so that in an assembled state the holding arm (4) extends from the headgear (3) in a direction of view of a user towards a front;
   a seat and holder (6) for the multimedia terminal (2) arranged at a second end (4b) of the holding arm;
   said seat and holder (6) for the multimedia terminal (2) being adjustable in reference to the holding arm (4) such that at least a graphic display device (2a) of a multimedia terminal (2) received therein, after fastening of the holding arm (4) at the headgear (3), is essentially adapted to be located in a middle of a field of view of the user;
   at least one clamping element (7.1, 7.2) with a clamping structure (7.1b, 7.2b), and at least one counterpart located in proximity to the first end of the holding arm provided for the at least one clamping element (7.1, 7.2) in order to connect the clamping element (7.1a, 7.2a) to the holding arm (4) in a detachable fashion, and to fix the holding device (1) with the first end (4a) of the holding arm (4) in proximity of the clamping structure (7.1b, 7.2b) to the headgear (3) in a detachable fashion; and
   the seat and holder (6) arranged at the second end (4b) of the holding arm (4) for the multimedia terminal (2) comprise at least a second clamping element (6.1, 6.2) with a clamping structure (6.1a, 6.2a) and in proximity of the second end (4b) of the holding arm (4) at least one penetration (4.3a, 4.3b) is provided for a second counterpart (6.3, 6.4) cooperating with the second clamping element (6.1, 6.2) in order to connect the second clamping element (6.1, 6.2) in a detachable fashion to the holding arm (4) and to detachably fix the multimedia terminal (2) to the second end (4b) of the holding arm (4), by the second clamping element (6.1, 6.2) comprising at least one seat (6.1b, 6.2b), and the second counterpart (6.3, 6.4) essentially being inserted in a form-fitting fashion in the seat (6.1b, 6.2b) or vice versa.

14. The holding device (1) according to claim 13, wherein at least two of the second clamping elements (6.1, 6.2) are arranged spaced apart at a distance from each other at the second end (4b) of the holding arm (4), which distance is adjustable.

15. The holding device (1) according to claim 13, wherein the second clamping element (6.1, 6.2) and the second counterpart (6.3, 6.4) are embodied complementarily.

16. A holding device (1) for a mobile digital multimedia terminal (2), comprising:
- a holding arm (4);
- a fastening device (5) arranged at a first end (4a) of the holding arm (4), embodied for fastening the holding arm to a headgear (3), so that in an assembled state the holding arm (4) extends from the headgear (3) in a direction of view of a user towards a front;
- a seat and holder (6) for the multimedia terminal (2) arranged at a second end (4b) of the holding arm;
- said seat and holder (6) for the multimedia terminal (2) being adjustable in reference to the holding arm (4) such that at least a graphic display device (2a) of a multimedia terminal (2) received therein, after fastening of the holding arm (4) at the headgear (3), is essentially adapted to be located in a middle of a field of view of the user;
- at least one clamping element (7.1, 7.2) with a clamping structure (7.1b, 7.2b), and at least one counterpart located in proximity to the first end of the holding arm provided for the at least one clamping element (7.1, 7.2) in order to connect the clamping element (7.1a, 7.2a) to the holding arm (4) in a detachable fashion, and to fix the holding device (1) with the first end (4a) of the holding arm (4) in proximity of the clamping structure (7.1b, 7.2b) to the headgear (3) in a detachable fashion; and
- for fixation to a sun visor (3a) of the headgear (3) at least one additional clamping element (8) is provided, said clamping element (8) is connectable in a detachable fashion to the holding arm (4) and the sun visor (3a).

17. The holding device (1) according to claim 16, wherein the clamping element (8) comprises at least two plug-in parts (8.1, 8.2) which are embodied to encompass the holding arm and to be connected thereto in a detachable fashion and cooperate therewith, with one of the plug-in parts (8.2) comprising a projecting structure (8.2b) intended to contact the sun visor (3a) of the headgear (3) at a side facing away from the holding arm (4).

18. The holding device (1) according to claim 17, wherein the clamping element (8) has a structured or coated surface at the projecting structure (8.2b) adapted to contact the sun visor (3a) of the headgear (3) from a bottom thereof in a non-slip fashion.

19. The holding device (1) according to claim 16, wherein the plug-in parts (8.1, 8.2) are embodied complementarily, and comprise a screw, latch, press-fit, magnet, or Velcro connection.

* * * * *